(12) United States Patent
An et al.

(10) Patent No.: US 11,866,872 B2
(45) Date of Patent: Jan. 9, 2024

(54) LAUNDRY TREATING APPARATUS

(71) Applicant: LG ELECTRONICS INC., Seoul (KR)

(72) Inventors: Yongjun An, Seoul (KR); Myungjun Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 17/666,996

(22) Filed: Feb. 8, 2022

(65) Prior Publication Data

US 2022/0251758 A1  Aug. 11, 2022

(30) Foreign Application Priority Data

Feb. 8, 2021  (KR) .................. 10-2021-0017316

(51) Int. Cl.
*D06F 37/30* (2020.01)
*D06F 37/22* (2006.01)
*D06F 37/26* (2006.01)
*D06F 58/08* (2006.01)
*D06F 58/20* (2006.01)
*F16C 3/02* (2006.01)
*H02K 5/24* (2006.01)
(Continued)

(52) U.S. Cl.
CPC ............ *D06F 37/304* (2013.01); *D06F 37/22* (2013.01); *D06F 37/26* (2013.01); *D06F 58/08* (2013.01); *D06F 58/20* (2013.01); *F16C 3/02* (2013.01); *H02K 5/24* (2013.01); *H02K 7/003* (2013.01); *H02K 7/116* (2013.01); *H02K 9/06* (2013.01); *H02K 21/22* (2013.01)

(58) Field of Classification Search
CPC ..................................................... D06F 37/304
See application file for complete search history.

(56) References Cited

U.S. PATENT DOCUMENTS 2,975,528 A  3/1961  Shewmon
4,407,078 A  10/1983  Takeyama

FOREIGN PATENT DOCUMENTS

CN  101302701  11/2008
CN  103911801  7/2014
(Continued)

OTHER PUBLICATIONS

Office Action in Chinese Appln. No. 202210118256.7, dated Mar. 25, 2023, 14 pages(with English translation).
(Continued)

*Primary Examiner* — Jason Y Ko
(74) *Attorney, Agent, or Firm* — Fish & Richardson P.C.

(57) ABSTRACT

The present disclosure relates to a laundry treating apparatus including a drum, which includes a drum body, a front cover, a rear cover, and a drum introduction opening, a fixing panel, a housing, which includes a housing body having an accommodation space formed therein and a housing cover, an input shaft having an end located outside the accommodation space and an opposite end located in the accommodation space, an output shaft having an end secured to the rear cover and an opposite end located in the accommodation space, a gear unit for transmitting the rotational motion of the input shaft to the output shaft, a motor, which includes a stator and a rotor, a coupling body connecting the input shaft to the rotor, and a first heat dissipation part for forming an airflow between the housing body and the rotor during rotation of the rotor.

15 Claims, 12 Drawing Sheets

(51) Int. Cl.
*H02K 7/00* (2006.01)
*H02K 7/116* (2006.01)
*H02K 9/06* (2006.01)
*H02K 21/22* (2006.01)

(56) References Cited

FOREIGN PATENT DOCUMENTS

| | | |
|---|---|---|
| CN | 106661815 | 5/2017 |
| EP | 2487290 | 8/2012 |
| FR | 2264118 | 10/1975 |
| JP | 2006-034333 | 2/2006 |
| KR | 20200065931 | 6/2020 |
| WO | WO2007107512 | 9/2007 |

OTHER PUBLICATIONS

Extended European Search Report in European Appln. No. 22155152.6, dated Jul. 6, 2022, 8 pages.

[FIG. 1]
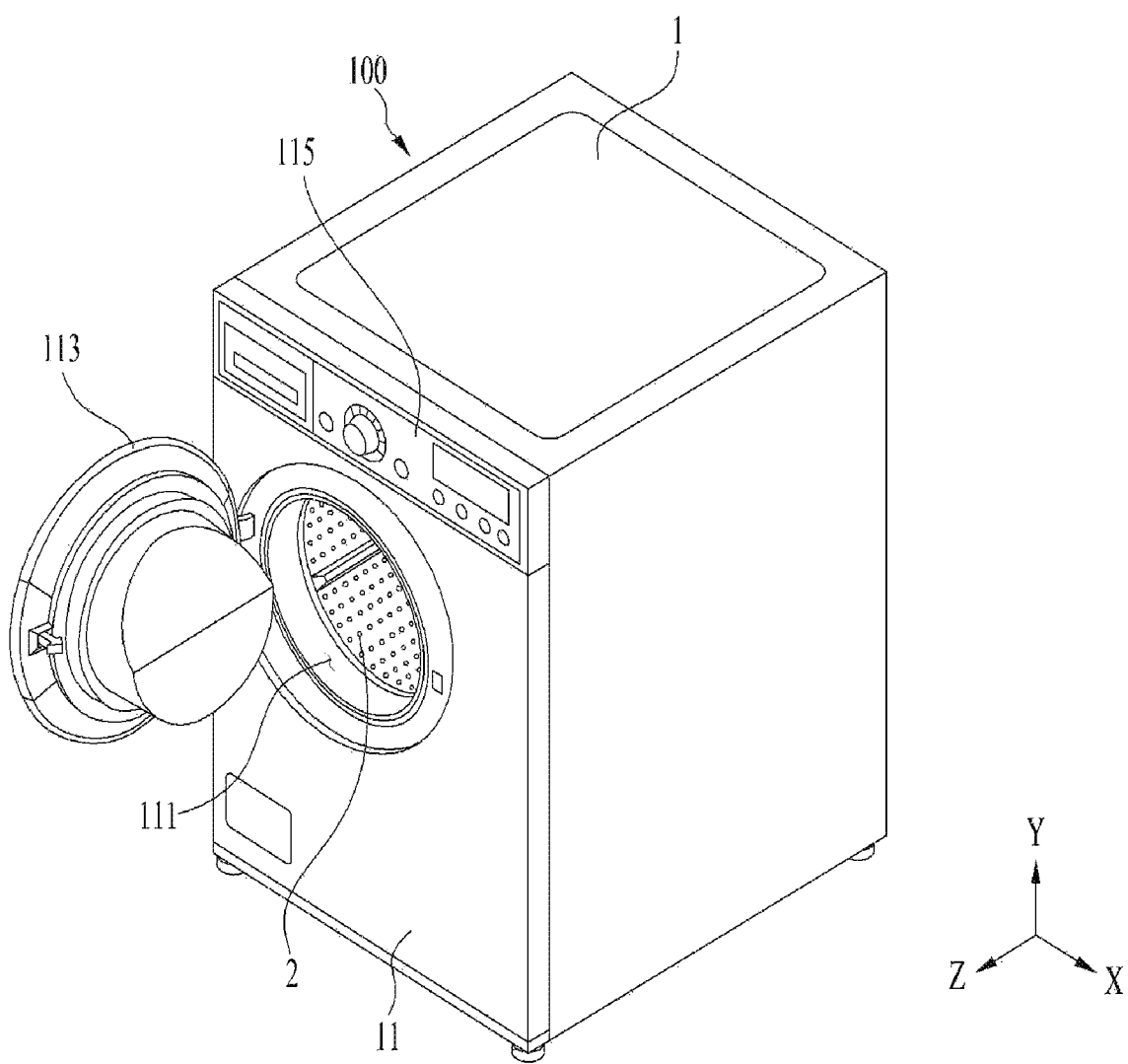

[FIG. 2]
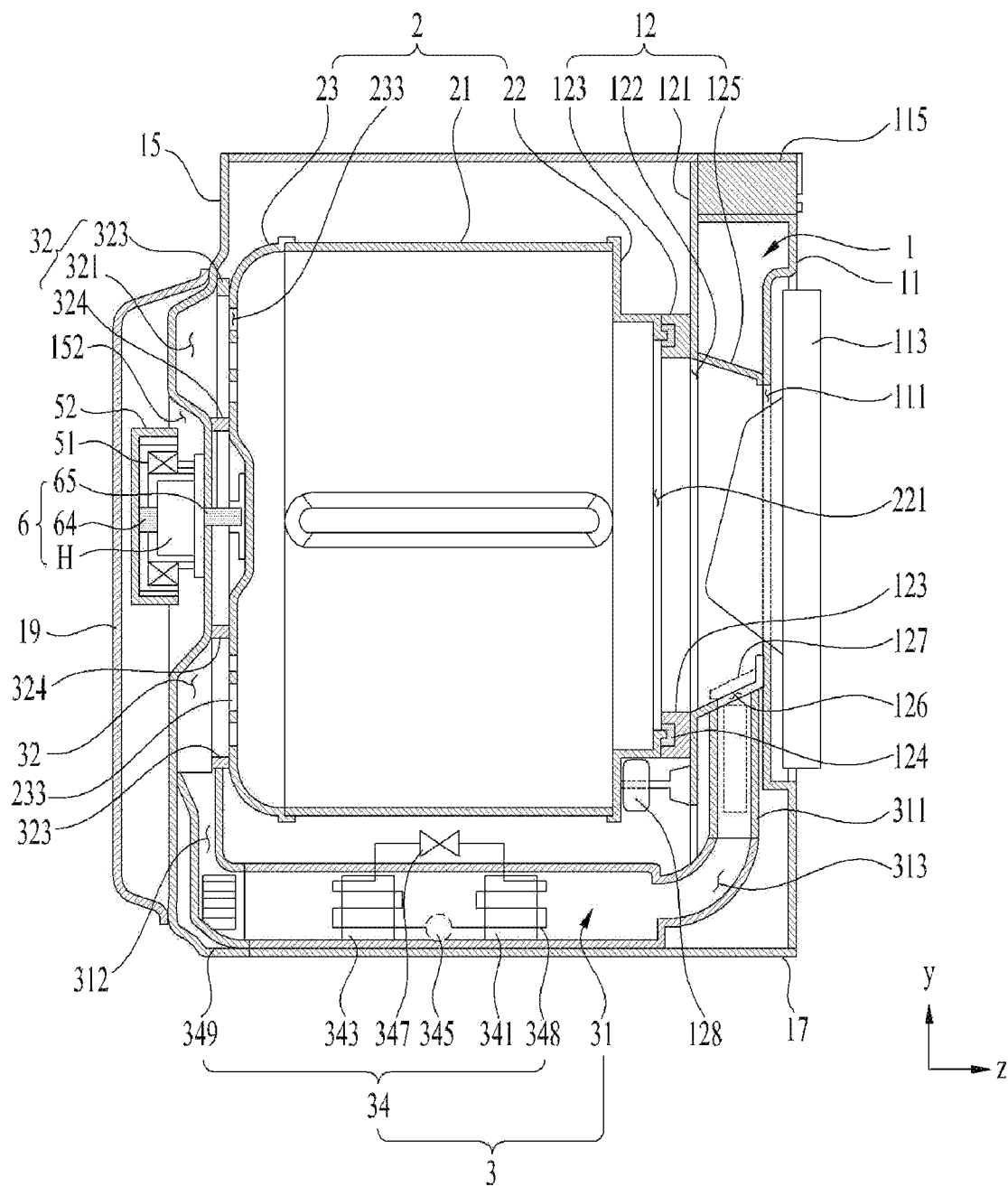

[FIG. 3]
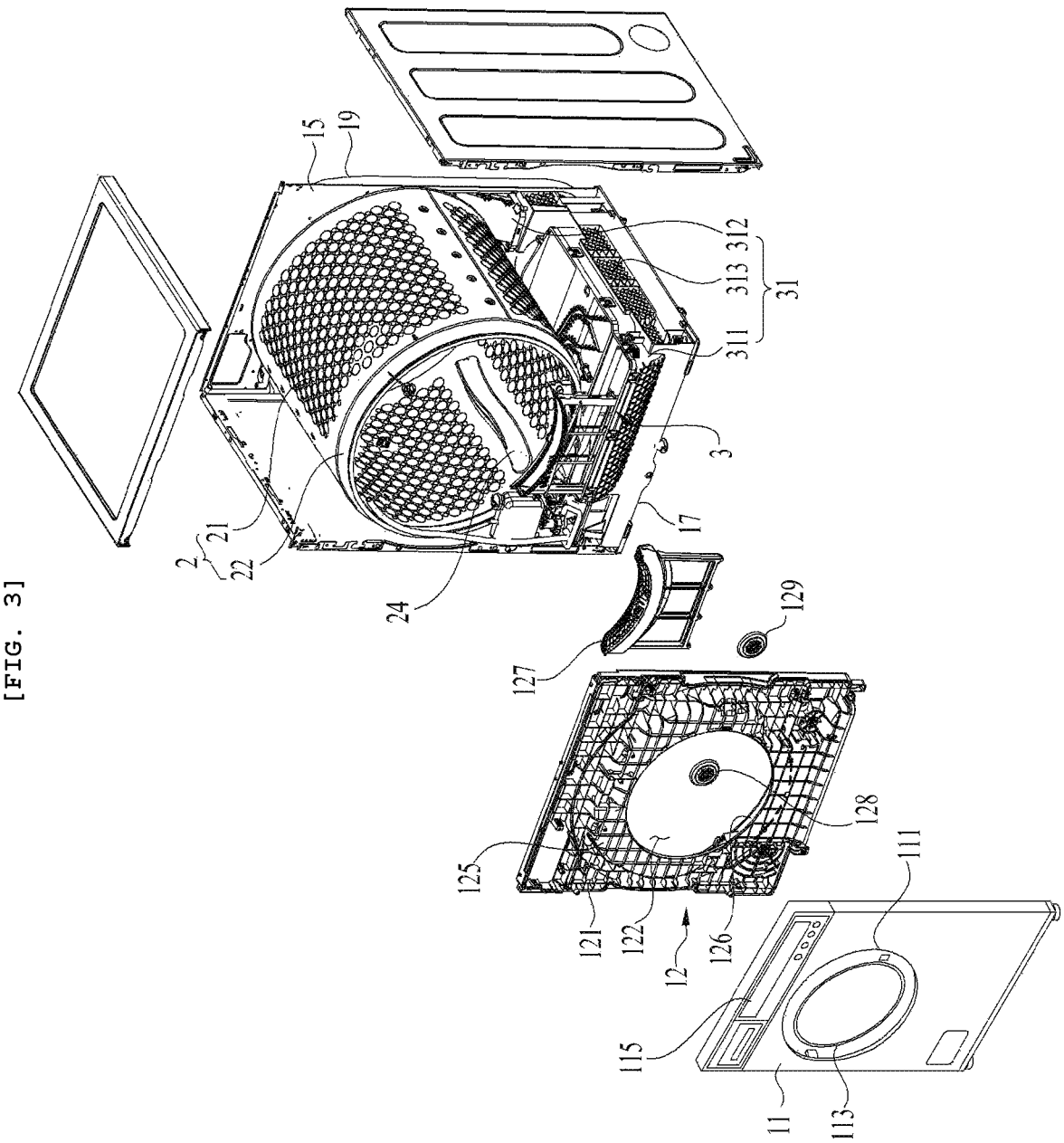

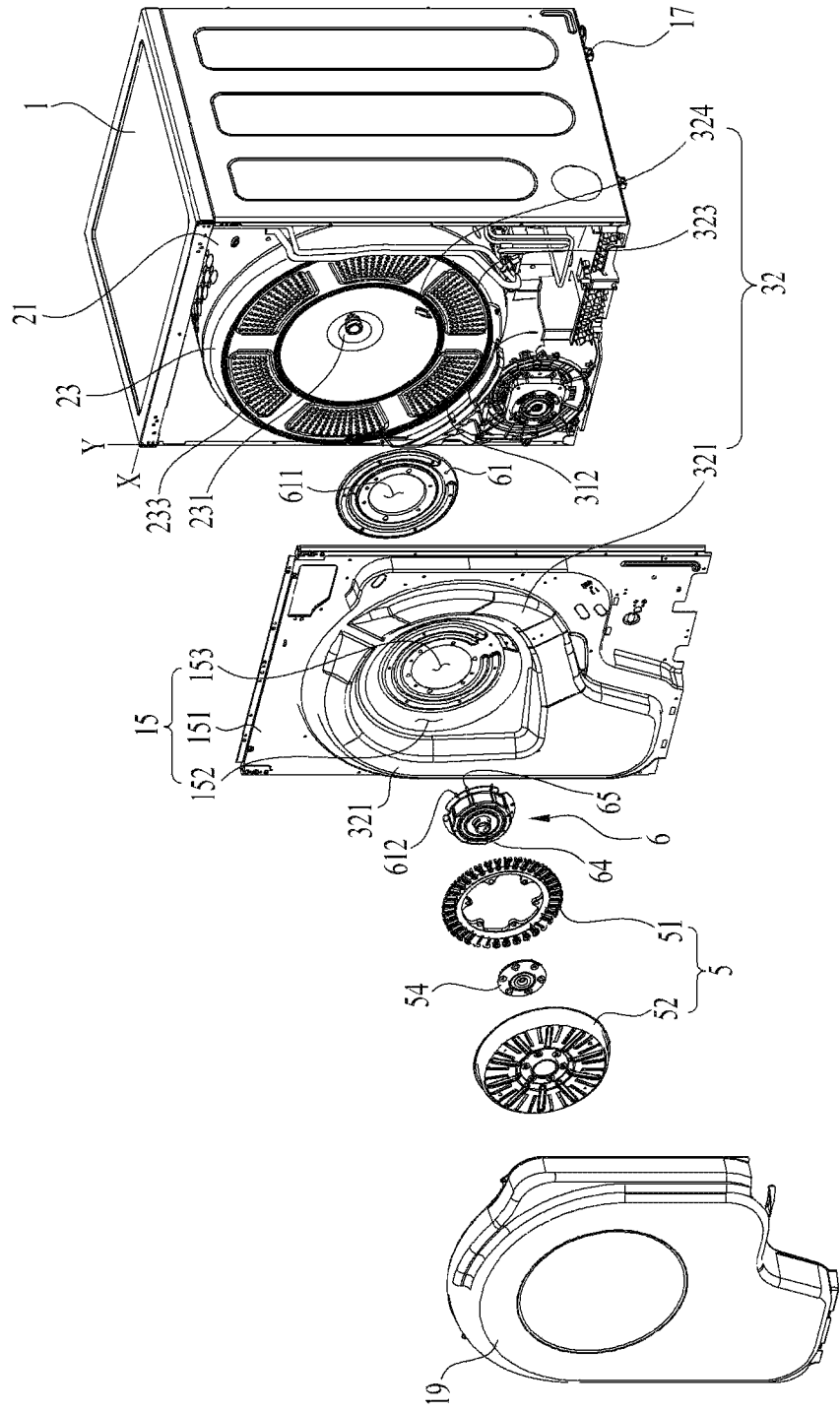
[FIG. 4]

[FIG. 5]
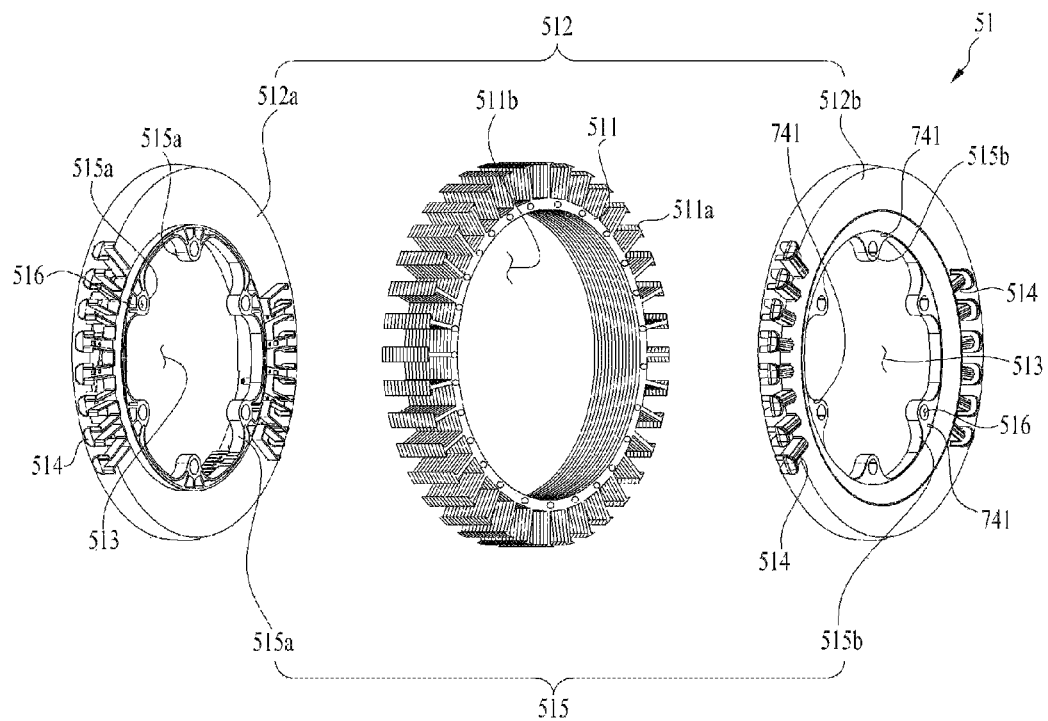
[FIG. 6]
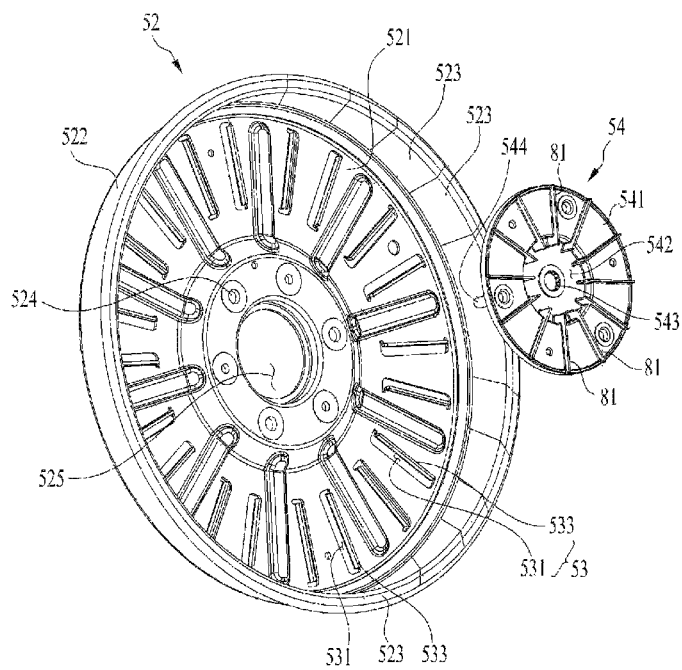

[FIG. 7]
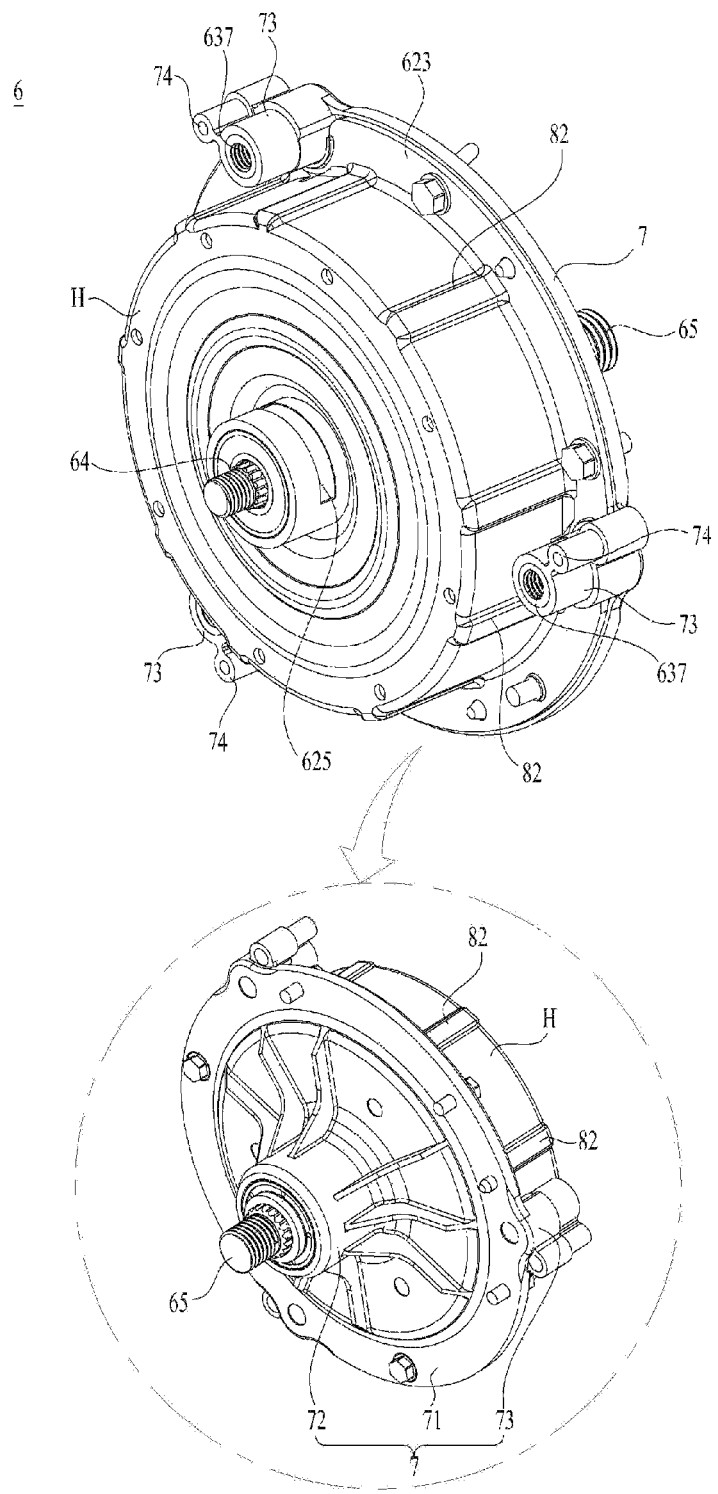

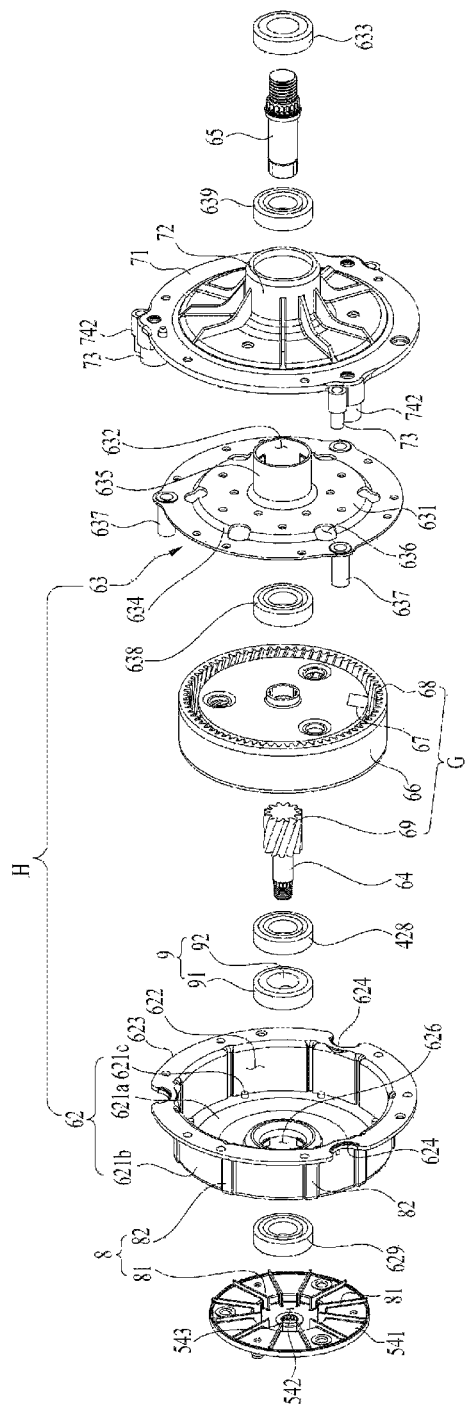
[FIG. 8]

[FIG. 9]
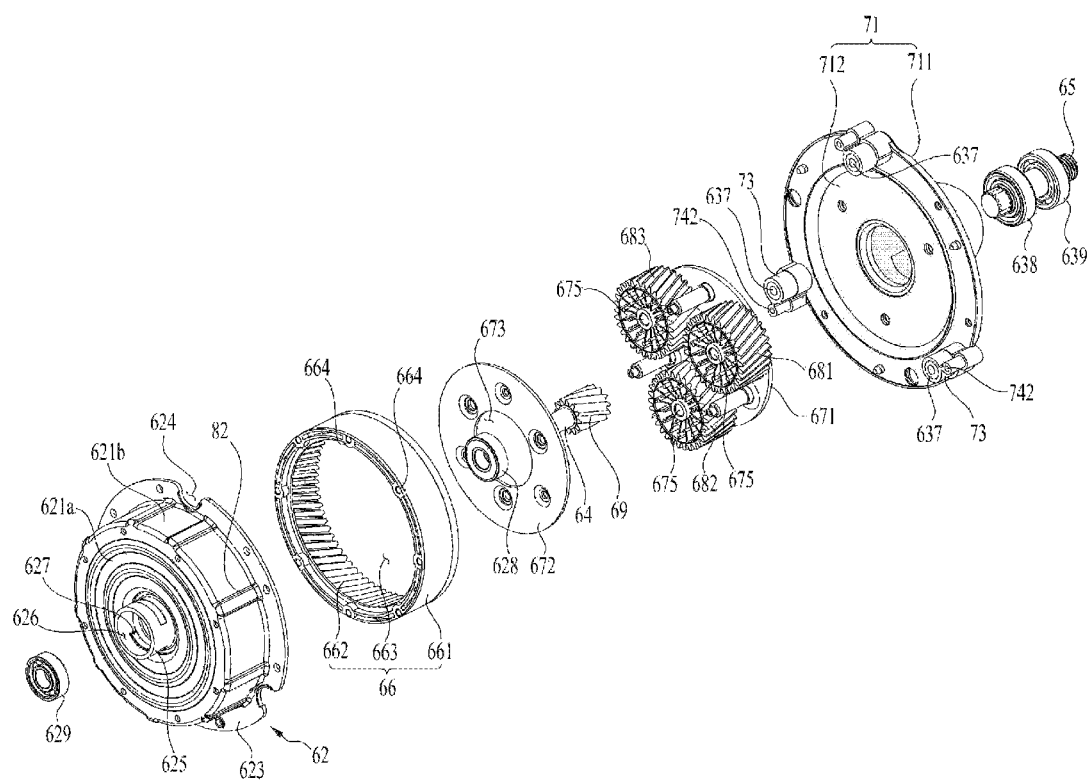

[FIG. 10]
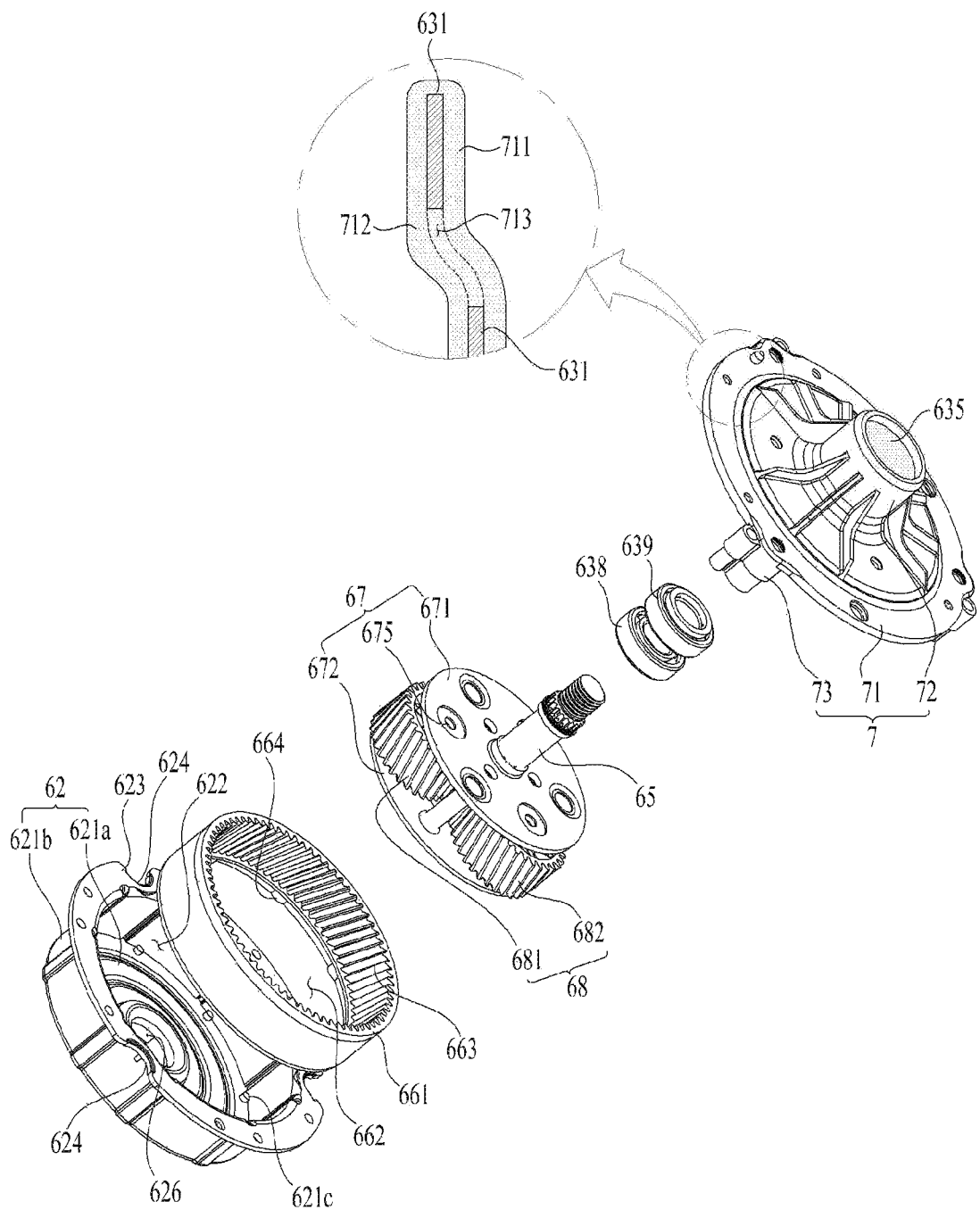

[FIG. 11]
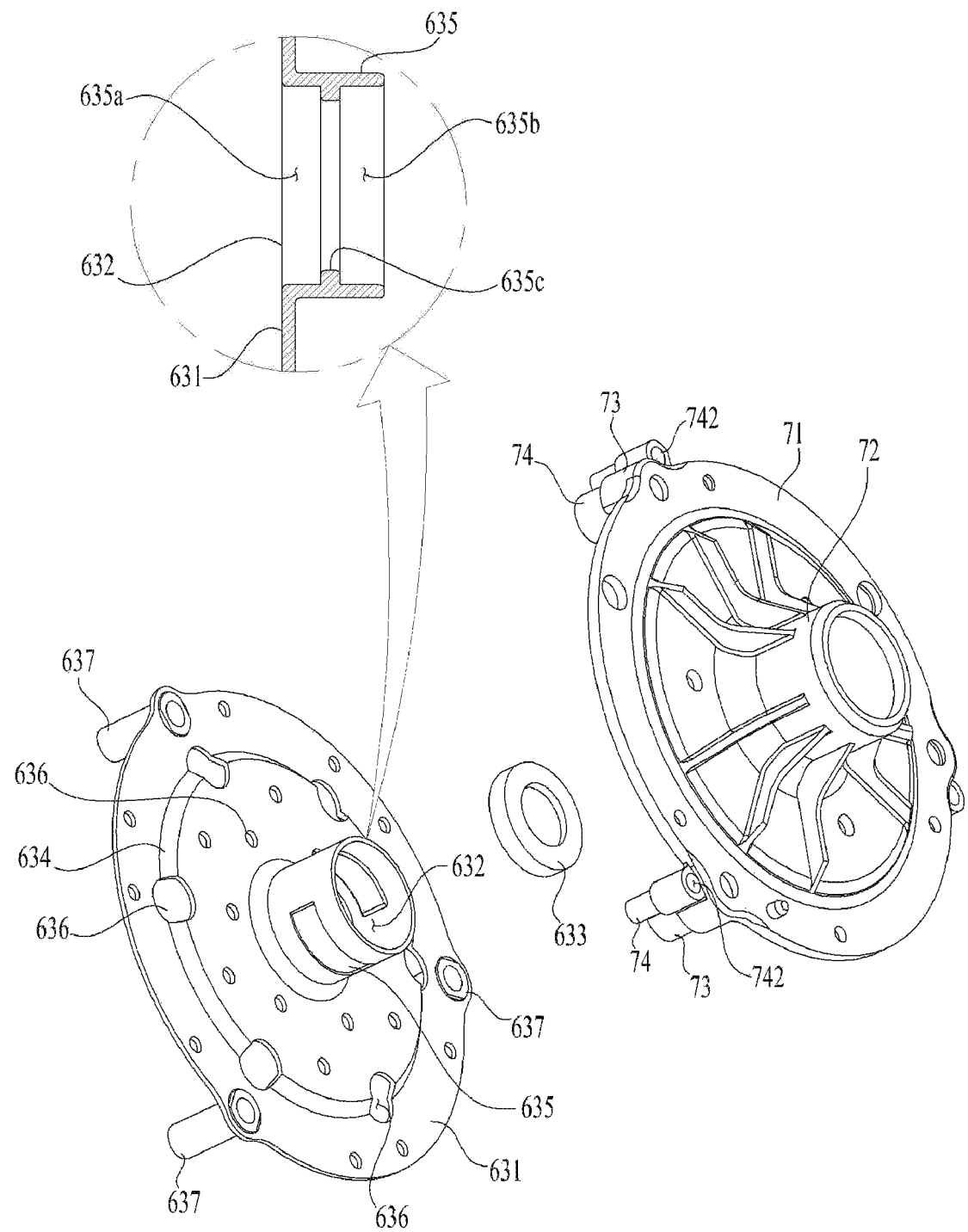

[FIG. 12]
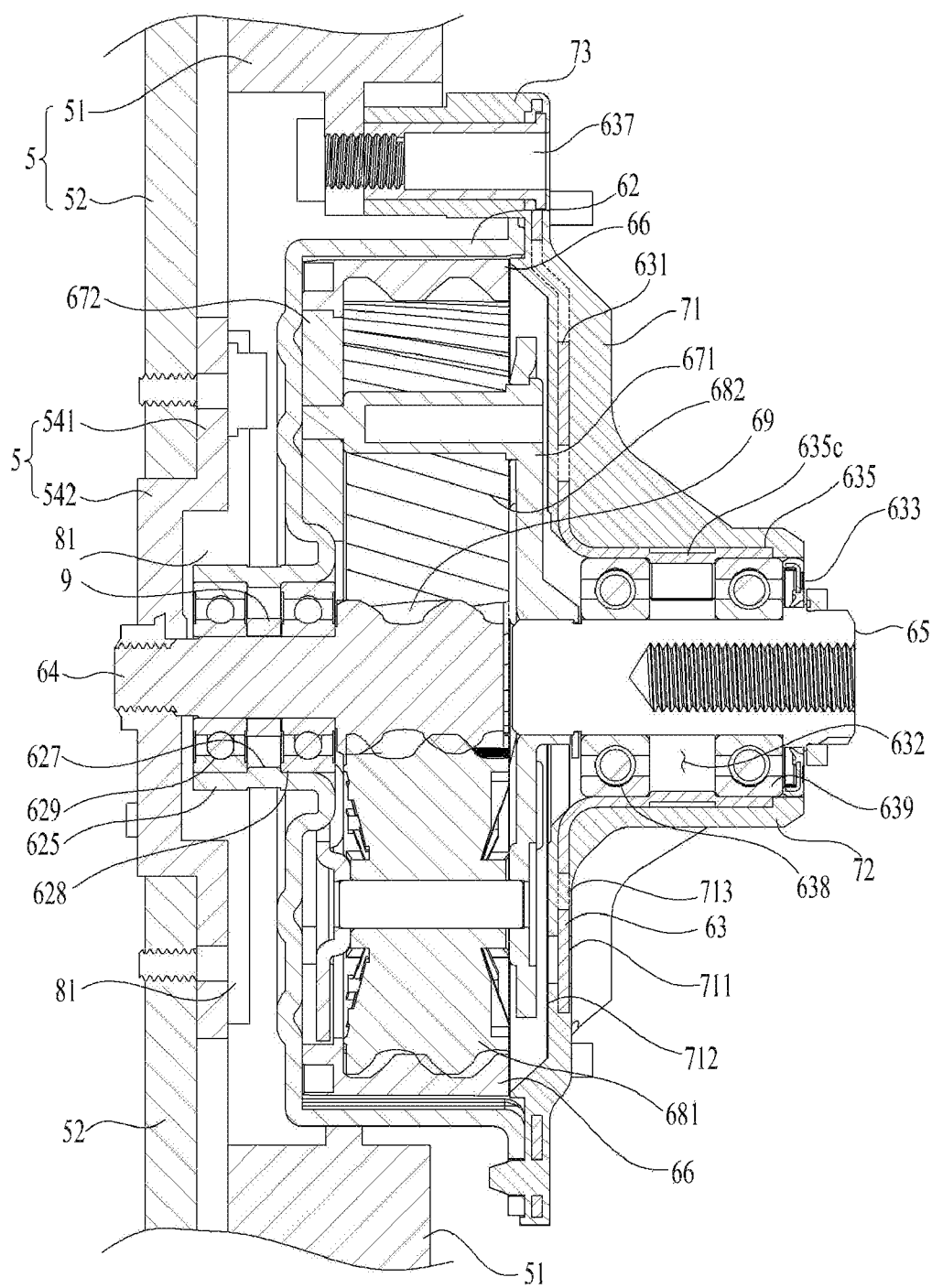

[FIG. 13]
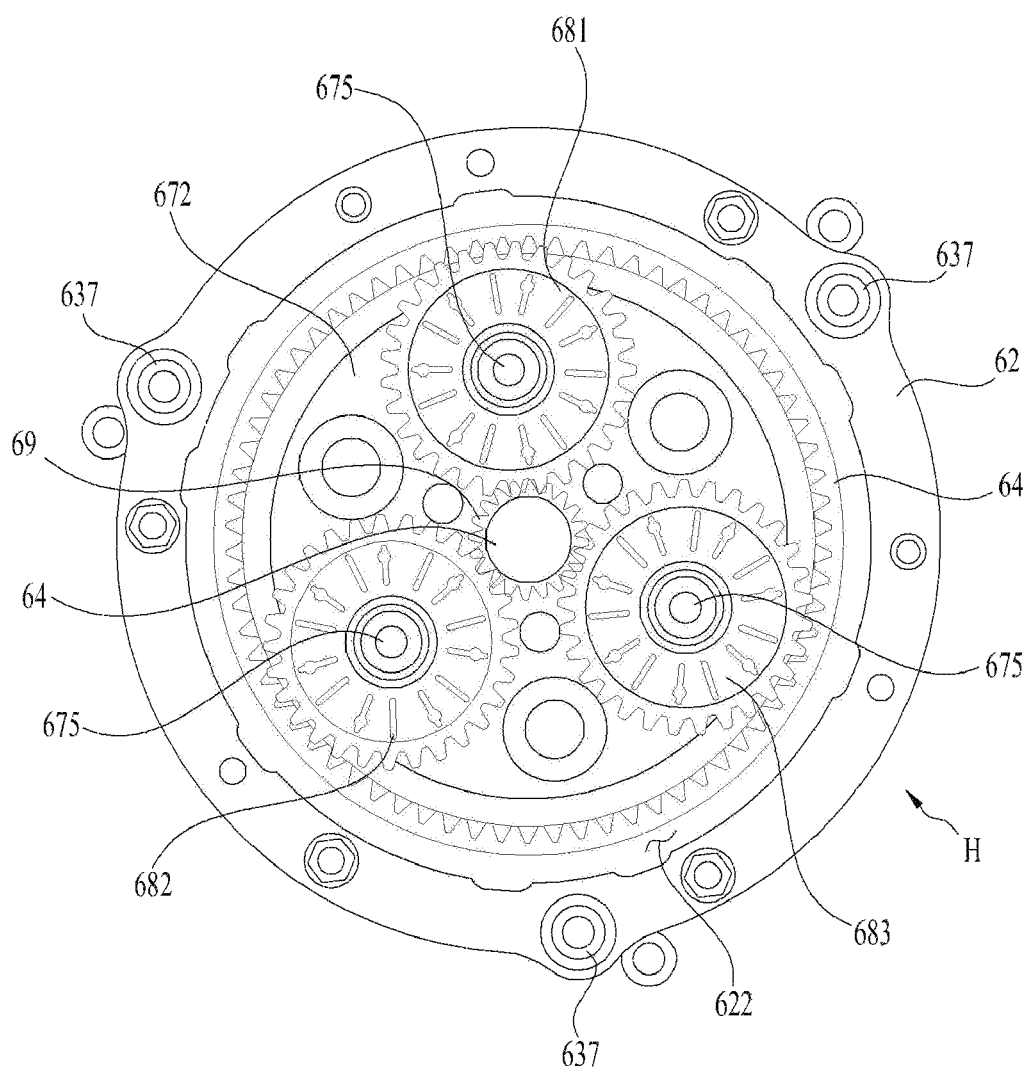

LAUNDRY TREATING APPARATUS

CROSS-REFERENCE TO RELATED APPLICATIONS

This application claims the benefit of Korea Patent Application No. 10-2021-0017316, filed Feb. 8, 2021, which is incorporated herein by reference for all purposes as if fully set forth herein.

TECHNICAL FIELD

The present disclosure relates to a laundry treating apparatus.

BACKGROUND ART

"Laundry treating apparatus" is a general term for a washing machine for washing laundry (an object to be washed or an object to be dried), a dryer for drying laundry, and an apparatus capable of both washing and drying laundry.

The washing machine generally includes a tub, which stores water therein, a washing drum, which is provided in the tub to store laundry therein, and a driving unit (a washing driving unit), which rotates the washing drum. The dryer generally includes a drying drum, which stores laundry therein, a driving unit (a drying driving unit), which rotates the drying drum, and a heat exchange unit, which supplies air to the drying drum to remove moisture from laundry.

The washing driving unit generally includes a stator, which is secured to the tub to form a rotating magnetic field, a rotor, which is rotated by the rotating magnetic field, and a rotation shaft, which passes through the tub to connect the washing drum to the rotor. The drying driving unit generally includes a motor, a pulley, which is secured to the rotation shaft of the motor, and a belt (a power transmission unit), which transmits the rotational motion of the pulley to the drying drum.

The washing driving unit is configured such that the rotation shaft of the motor connects the washing drum to the rotor. In order to wash or spin-dry laundry, the washing driving unit needs to increase the rate of rotation of the washing drum or to change the rotation direction of the washing drum. When the rotation shaft of the motor directly connects the washing drum to the rotor, it is possible to easily control the rate of rotation and the rotation direction of the washing drum.

Meanwhile, the conventional drying driving unit is generally structured such that a power transmission unit, such as a belt, connects the drying drum to the rotation shaft of the motor. The reason why the dryer employs a power transmission unit, such as a belt, in order to rotate the drying drum is that the rate of rotation of the drying drum does not need to be maintained particularly high and that the rotation direction of the drying drum generally does not need to be changed. However, if the dryer is designed so as to be capable of changing the rate of rotation and the rotation direction of the drying drum, movement of laundry in the drying drum may be capable of being controlled, leading to a reduction in the drying time and improvement of drying performance.

There is disclosed a conventional dryer that includes a drying driving unit connecting a rotor to a drying drum using a speed reducer (Korean Patent Laid-Open Publication No. 10-2020-0065931). The drying driving unit is structured such that an input shaft, connected to the rotor, and an output shaft, connected to the drying drum, are disposed coaxially. Accordingly, it may be possible to shorten the drying time or to improve drying performance. However, heat supplied to the drying drum is transferred to the inside of the drying driving unit, which may lead to deterioration in the durability of the drying driving unit.

DISCLOSURE

Technical Task

An object of the present disclosure is to provide a laundry treating apparatus, which includes a power transmission unit configured to connect an input shaft, which is connected to a rotor, and an output shaft, which is connected to a drum, to each other such that the input shaft and the output shaft are disposed coaxially.

In addition, another object of the present disclosure is to provide a laundry treating apparatus, which includes a means for dissipating heat in the power transmission unit to the outside, thereby minimizing deterioration in the durability of the power transmission unit.

Technical Solutions

The present disclosure provides a laundry treating apparatus including a drum, which includes a drum body providing a space to store an object to be dried (laundry or the like) therein, a front cover forming the front surface of the drum body, a rear cover forming the rear surface of the drum body, and a drum introduction opening formed through the front cover to communicate with the inside of the drum body, a fixing panel disposed at a position spaced apart from the rear cover, a housing, which includes a housing body secured to the fixing panel and having formed therein an accommodation space and an opening allowing the accommodation space to communicate with the outside and a housing cover coupled to the housing body to close the opening, an input shaft penetrating the housing body such that one end thereof is located outside the accommodation space and the opposite end thereof is located in the accommodation space, an output shaft penetrating the housing cover such that one end thereof is secured to the rear cover and the opposite end thereof is located in the accommodation space, a gear unit located in the accommodation space to transmit the rotational motion of the input shaft to the output shaft, a motor, which includes a stator secured to the fixing panel or the housing to form a rotating magnetic field and a rotor configured to be rotated by the rotating magnetic field, a coupling body secured to the rotor to connect the input shaft to the rotor, and a first heat dissipation part provided at the coupling body to form an airflow between the housing body and the rotor during rotation of the rotor.

The first heat dissipation part may include a blade protruding from the coupling body toward the housing body.

The first heat dissipation part may include a plurality of blades, which protrude from the coupling body toward the housing body and are radially disposed about the input shaft.

The laundry treating apparatus may further include a motor heat dissipation part provided at the rotor to dissipate the heat in the rotor to the outside of the rotor.

The rotor may include a rotor body to which the coupling body is secured, a rotor circumferential surface extending from the rotor body so as to surround the circumferential surface of the stator, and a plurality of permanent magnets disposed along the rotor circumferential surface such that N-poles and S-poles are alternately exposed. The motor heat dissipation part may include a rotor through-hole formed through the rotor body and extending in the diameter direction of the rotor body and a rotor blade protruding from the rotor body and extending along the edge of the rotor through-hole.

The laundry treating apparatus may further include a coupling body bent portion formed by bending a portion of the coupling body toward the rotor. The blade may extend from the coupling body bent portion to the edge of the coupling body.

The laundry treating apparatus may further include a second heat dissipation part provided at the housing body to dissipate the heat in the accommodation space to the outside of the accommodation space.

The housing body may include a housing base, an input shaft through-hole formed through the housing base to allow the input shaft to be inserted thereinto, and a housing circumferential surface extending from the edge of the housing base toward the fixing panel. The second heat dissipation part may include a housing protruding portion protruding from the housing circumferential surface.

The housing body may include a housing base, an input shaft through-hole formed through the housing base to allow the input shaft to be inserted thereinto, and a housing circumferential surface extending from the edge of the housing base toward the fixing panel. The second heat dissipation part may include a housing bent portion bent from the housing circumferential surface toward the accommodation space.

The housing body may include a housing base, an input shaft through-hole formed through the housing base to allow the input shaft to be inserted thereinto, and a housing circumferential surface extending from the edge of the housing base toward the fixing panel. The second heat dissipation part may include a cooling fin protruding from the housing circumferential surface.

The laundry treating apparatus may further include an input shaft through-hole formed through the housing body to allow the input shaft to be inserted thereinto, a pipe-shaped input shaft support portion extending from the input shaft through-hole toward the rotor, a first input shaft bearing provided at the input shaft support portion to rotatably couple the input shaft to the input shaft through-hole, a second input shaft bearing provided at the input shaft support portion so as to be located between the first input shaft bearing and the coupling body to rotatably couple the input shaft to the input shaft through-hole, a coupling body bent portion provided at the coupling body to form a space in which the input shaft support portion is accommodated, and a bent portion through-hole formed through the rotor to allow the coupling body bent portion to be inserted thereinto.

The laundry treating apparatus may further include a damper located between the first input shaft bearing and the second input shaft bearing to dampen the transmission of vibration of the first input shaft bearing to the second input shaft bearing.

The gear unit may include a ring gear secured to the housing body so as to be located in the accommodation space, a driving gear secured to the input shaft so as to be located in the accommodation space, a cage located in the accommodation space to allow the opposite end of the output shaft to be secured thereto, and a driven gear rotatably secured to the cage to connect the driving gear to the ring gear.

Advantageous Effects

The present disclosure provides a laundry treating apparatus, which includes a power transmission unit configured to connect an input shaft, which is connected to a rotor, and an output shaft, which is connected to a drum, to each other such that the input shaft and the output shaft are disposed coaxially.

In addition, the present disclosure provides a laundry treating apparatus, which includes a means for dissipating heat in the power transmission unit to the outside, thereby minimizing deterioration in the durability of the power transmission unit.

DESCRIPTION OF DRAWINGS

FIGS. 1 and 2 are views showing an example of a laundry treating apparatus.

FIGS. 3 and 4 are views showing an example of the internal structure of the laundry treating apparatus.

FIG. 5 is a view showing an example of a stator.

FIG. 6 is a view showing an example of a rotor.

FIGS. 7 to 10 are views showing an example of a power transmission unit.

FIG. 11 is a view showing an example of a heat insulation part.

FIGS. 12 and 13 are views showing the cross-section of the power transmission unit.

BEST MODE FOR DISCLOSURE

Hereinafter, embodiments of a laundry treating apparatus will be described in detail with reference to the accompanying drawings.

FIG. 1 is a view showing an example of a laundry treating apparatus 100. The laundry treating apparatus 100 may include a cabinet 1 and a drum 2, which is rotatably provided inside the cabinet and provides a space for storing laundry (an object to be washed or an object to be dried). As shown in FIG. 2, a drying unit 3 may be provided inside the cabinet 1 in order to remove moisture from laundry by supplying high-temperature dry air (air having a temperature higher than room temperature or air having dryness higher than the dryness of indoor air) to the drum 2.

As shown in FIG. 3, the cabinet 1 may include a front panel 11, which forms the front surface of the laundry treating apparatus, and a base panel 17, which forms the bottom surface of the laundry treating apparatus. The front panel 11 has formed therein an introduction opening 111, which communicates with the drum 2. The introduction opening 111 may be closed by a door 113.

A control panel 115 may be provided on the front panel 11. The control panel 115 may include an input unit for receiving a control command from a user and a display for outputting information, such as control commands selectable by the user. The input unit may include a power supply request unit for requesting the supply of power to the laundry treating apparatus, a course input unit for allowing the user to select a desired course from among a plurality of courses, and an execution request unit for requesting commencement of the course selected by the user.

The drum 2 may be formed in a hollow cylindrical shape. FIG. 2 is a view illustrating the case in which the drum 2 includes a drum body 21, which has the shape of a cylinder that has an open front surface and an open rear surface, a front cover 22, which forms the front surface of the drum body 21, and a rear cover 23, which forms the rear surface of the drum body 21. The front cover 22 may have formed therein a drum introduction opening 221, through which the inside of the drum body 21 communicates with the outside, and the rear cover 23 may have formed therein an air inlet 233, through which external air flows into the drum body 21.

As shown in FIG. 3, the drum body 21 may further include a lifter 24. The lifter 24 may be formed such that a board, which extends from the front cover 22 toward the rear cover 23, protrudes from the drum body 21 toward the rotation center of the drum 2 (protrudes from the circumferential surface of the drum toward the rotation center of the drum).

In the laundry treating apparatus 100, the drum 2 may have a drum through-hole, which is formed through the drum body 21 so that the inside of the drum communicates with the outside of the drum. However, when the laundry treating apparatus 100 is configured as a laundry drying apparatus, the drum 2 may not have a drum through-hole therein.

The drum 2 may be rotatably secured to at least one of a first body support part 12 or a second body support part 15. The drawings illustrate the case in which the rear cover 23 is rotatably secured to the second body support part 15 via a motor 5 (a driving unit) and in which the front cover 22 is rotatably connected to the first body support part 12.

The first body support part 12 may be formed as a support panel 121, which is secured to the cabinet 1 and is located between the front panel 11 and the front cover 22. The support panel 121 may be secured to the base panel 17, and may be located between the front panel 11 and the front cover 22. In this case, the rear surface of the front panel 11 (the surface facing the support panel) may be secured to the support panel 121, and the lower end thereof may be secured to the base panel 17.

The support panel 121 may include a support panel through-hole 122, a drum connection body 123 (refer to FIG. 2) connecting the support panel through-hole 122 to the drum introduction opening 221, and a panel connection body 125 connecting the support panel through-hole 122 to the introduction opening 111. The support panel through-hole 122 may be formed through the support panel 121 so that the introduction opening 111 communicates with the drum introduction opening 221.

As shown in FIG. 2, the drum connection body 123 may be formed as a pipe that is secured to the rear surface of the support panel 121 (the surface facing the drum introduction opening in the space provided by the support panel). One end of the drum connection body 123 may be formed so as to surround the support panel through-hole 122, and the free end of the drum connection body 123 may be formed so as to support the front cover 22. That is, the free end of the drum connection body 123 may be inserted into the drum introduction opening 221, or may be in contact with the free end of the front cover 22, which forms the drum introduction opening 221.

FIG. 2 illustrates the case in which the free end of the drum connection body 123 is in contact with the free end of the front cover 22. In this case, the drum connection body 123 may be provided with a ring-shaped connection damper 124. The connection damper 124 serves to minimize the risk of separation of the drum introduction opening 221 from the drum connection body 123 (the risk of leakage of air in the drum to the cabinet) when the drum 2 rotates or vibrates.

The panel connection body 125 may be formed as a pipe that is secured to the front surface of the support panel 121 (the surface facing the front panel in the space provided by the support panel). One end of the panel connection body 125 may be formed so as to surround the support panel through-hole 122, and the other end of the panel connection body 125 may be formed so as to be connected to the introduction opening 111. Therefore, the laundry supplied to the introduction opening 111 may move to the drum body 21 through the panel connection body 125, the support panel through-hole 122, the drum connection body 123, and the drum introduction opening 221.

The support panel 121 may have an exhaust port 126, which is formed through the panel connection body 125, and a filter 127 may be detachably secured to the exhaust port 126. The filter 127 may be formed in any of various structures, so long as the same is capable of removing foreign substances from the air moving from the drum 2 to the exhaust port 126.

The support panel 121 may be further provided with drum support parts 128 and 129 for preventing the drum 2 from sagging. The drum support parts may include a first roller 128 and a second roller 129, which are secured to the support panel 121 and rotatably support the drum 2. Although it is illustrated in FIG. 3 that the first roller 128 and the second roller 129 support the drum body 21, the rollers 128 and 129 may support the front cover 22.

The second body support part 15 may be formed as a fixing panel 151, which is secured to the cabinet 1 so as to be located at a point spaced apart from the rear cover 23. FIG. 4 illustrates the case in which the fixing panel 151 is secured to the base panel 17 to form the rear surface of the laundry treating apparatus 100 (the rear surface of the cabinet).

The fixing panel 151 may have formed therein a driving-unit-mounting recess 152, which provides a space in which the motor 5 is mounted. The driving-unit-mounting recess 152 may be formed such that a portion of the fixing panel 151 is concavely depressed toward the rear cover 23 of the drum. The fixing panel 151 may have a fixing panel through-hole 153 formed therein to allow a shaft (an output shaft) for rotating the drum 2 to pass therethrough. The fixing panel through-hole 153 may be located within the driving-unit-mounting recess 152.

As described above, when the drum 2 includes the drum body 21, the front cover 22 secured to the drum body, and the rear cover 23 secured to the drum body, the rigidity of the drum is higher than that of a structure in which the open front surface and the open rear surface of the drum body 21 are rotatably connected to the support panel 121 and the fixing panel 151, respectively. The increase in the rigidity of the drum may minimize deformation of the drum body 21 during rotation of the drum, thus minimizing a problem in which laundry catches in the space between the drum body and the support panel or in the space between the drum body and the fixing panel due to deformation of the drum body 21 (thereby minimizing the load on the motor).

As shown in FIG. 2, the drying unit 3 may include an exhaust passage 31, which is connected to the exhaust port 126, a supply passage 32, which guides the air in the exhaust passage 31 to the drum body 21, and a heat exchange unit 34, which is provided inside the exhaust passage 31 to sequentially dehumidify and heat air.

The exhaust passage 31 may include a first duct 311, which is connected to the exhaust port 126, a second duct 312, which is connected to the supply passage 32, and a third duct 313, which connects the first duct 311 to the second duct 312. The third duct 313 may be secured to the base panel 17.

The heat exchange unit 34 may be implemented as any of various devices, so long as the same is capable of sequentially dehumidifying and heating the air introduced into the exhaust passage 31. FIG. 2 illustrates the case in which the heat exchange unit 34 is implemented as a heat pump. That is, the heat exchange unit 34 includes a first heat exchanger 341 (a heat-absorbing part), which removes moisture from the air introduced into the exhaust passage 31, a second heat exchanger 343 (a heat-generating part), which is provided inside the exhaust passage 31 to heat the air that has passed through the heat-absorbing part 341, and a fan 349, which causes the air discharged from the drum 2 to sequentially pass through the heat-absorbing part and the heat-generating part and then to move to the supply duct 32.

The heat-absorbing part 341 and the heat-generating part 343 are sequentially disposed in the direction in which air flows, and are connected to each other via a refrigerant pipe 348, which forms a circulation path of the refrigerant. The refrigerant is moved along the refrigerant pipe 348 by a compressor 345, which is located outside the exhaust passage 31, and the refrigerant pipe 348 is provided with a pressure regulator 347 for controlling the pressure of the refrigerant.

As shown in FIG. 4, the air inlet 233, which is provided in the rear cover 23 of the drum, may be composed of a plurality of holes, which are disposed around the center of the rear cover 23 (the rotation center of the drum). In this case, the supply passage 32 may include a supply duct 321, which is provided in the fixing panel 151 to form a passage along which the air discharged from the second duct 312 moves, and a first passage-forming part 323 and a second passage-forming part 324, which guide the air in the supply duct 321 to the air inlet 233.

The supply duct 321 may be formed such that a portion of the fixing panel 151 is bent in a direction away from the rear cover 23 to form a passage (an air movement passage). In addition, the supply duct 321 may be formed in the shape of a ring that surrounds the driving-unit-mounting recess 152, and the second duct 312 may be formed so as to be connected to the circumferential surface of the supply duct 321.

The first passage-forming part 323 may be provided so as to surround the outer circumferential surface of the ring formed by the holes of the air inlet 233, and the second passage-forming part 324 may be provided so as to surround the inner circumferential surface of the ring formed by the holes of the air inlet 233.

The first passage-forming part 323 and the second passage-forming part 324 may be secured to the rear cover 23, or may be secured to the supply duct 321. FIG. 4 illustrates the case in which the passage-forming parts 323 and 324 are secured to the rear cover 23. In the case illustrated in FIG. 4, the free end of the first passage-forming part 323 surrounds the outer circumferential surface of the passage (the ring-shaped passage) formed by the supply duct 321, and the free end of the second passage-forming part 324 surrounds the inner circumferential surface of the passage formed by the supply duct 321. The first passage-forming part 323 and the second passage-forming part 324 may be made of rubber, felt, or the like.

The motor 5 for rotating the drum 2 includes a stator 51, which is located in the driving-unit-mounting recess 152 to form a rotating magnetic field, and a rotor 52, which is rotated by the rotating magnetic field. The rotational motion of the rotor 52 is transmitted to the drum 2 via a power transmission unit 6, which is secured to the fixing panel 151, and the stator 51 is secured to at least one of the fixing panel 151 or the power transmission unit 6. The structure in which the stator 51 is secured to the power transmission unit 6 is advantageous from the aspect of maintenance of coaxiality between an input shaft 64 and an output shaft 65, which are included in the power transmission unit 6 (consequently minimizing vibration of the laundry treating apparatus during rotation of the drum and minimizing deterioration in the durability of the power transmission unit).

In order to prevent the motor 5, which is provided in the driving-unit-mounting recess 152, from being exposed to the outside (in order to improve the durability of the motor and to prevent accidents by preventing the motor from being exposed to the external environment), the fixing panel 151 may be further provided with a cover panel 19 for preventing the motor 5 from being exposed to the outside. Further, the cover panel 19 may be formed in a shape that is also capable of preventing the supply duct 321 from being exposed to the outside (a shape surrounding the supply duct). The reason for this is not only to minimize radiation of heat to the outside of the supply duct 321, but also to prevent an accident, which may be caused by contact of the user's body with the supply duct 321.

As shown in FIG. 5, the stator 51 may include a core 511 (a ring-shaped core), which has a through-hole 511b (a core through-hole) formed in the center thereof, a plurality of support bars 511a, which protrude radially from the outer circumferential surface of the core 511, a core insulation part 512, which insulates the core and has a ring shape, a plurality of support bar insulation parts 514, which are provided in the core insulation part 512 to surround the support bars, and coils (not shown), which are provided in the support bar insulation parts 514.

The core insulation part 512 is formed in the shape of a ring that has an insulation part through-hole 513 formed in the center thereof to form a space in which the core 511 is accommodated. For ease of assembly, the core insulation part 512 may include a first insulation body 512a and a second insulation body 512b. In this case, the support bar insulation parts 514 may include first support bar insulation parts, which are provided in the first insulation body 512a, and second support bar insulation parts, which are provided in the second insulation body 512b.

The core insulation part 512 may be provided with a stator bracket 515. The stator bracket 515 may include a plurality of brackets, which protrude from the inner circumferential surface of the core insulation part 512 toward the center of the insulation part through-hole 513. When the core insulation part 512 includes the first insulation body 512a and the second insulation body 512b, the stator bracket 515 may include first brackets 515a, which are provided in the first insulation body, and second brackets 515b, which are provided in the second insulation body and are coupled to the first brackets 515a.

The stator bracket 515 may be secured to the power transmission unit 6 using a stator coupling part such as a bolt. To this end, the stator bracket 515 may have a coupling part through-hole 516 formed therein.

As shown in FIG. 6, the rotor 52 may include a rotor body 521, a rotor circumferential surface 522, which extends from the edge of the rotor body 521 toward the fixing panel 515 to form a space in which the stator 51 is accommodated, and a plurality of permanent magnets 523, which are secured to the rotor circumferential surface 522 such that N-poles and S-poles thereof are alternately exposed.

The motor 5 may further include a motor heat dissipation part 53, which dissipates the heat generated from the stator 51 to the outside of the rotor 52. The motor heat dissipation part 53 may include a plurality of rotor through-holes 531, which are formed through the rotor body 521, and a plurality of rotor blades 533, which are provided at the rotor body 521 to form airflow for inducing the air in the rotor to move to the rotor through-holes 531.

Each rotor through-hole 531 may be formed as a slit that extends from the center of the rotor body 521 toward the rotor circumferential surface 522, and each rotor blade 533 may be formed as a plate that protrudes from the rotor body 521 toward the fixing panel 151. In this case, it is desirable for each rotor blade 533 to extend from the center of the rotor body 521 toward the rotor circumferential surface 522. The rotor through-holes 531, each of which is formed as a slit, may be radially disposed about the center of the rotor body 521 (the input shaft), and each of the rotor blades 533 may be fixed to the edge of a respective one of the rotor through-holes 531.

FIG. 7 is a view showing an example of the power transmission unit 6. The power transmission unit 6 includes a housing H, which is secured to the fixing panel 151, an input shaft 64, which is rotatably secured to the bottom surface of the housing H (the surface oriented in a direction toward the rotor), an output shaft 65, which is rotatably secured to the upper surface of the housing H (the surface oriented in a direction toward the fixing panel), and a gear unit, which is provided inside the housing to transmit the rotational motion of the input shaft 64 to the output shaft 65. The input shaft 64 may be formed as a shaft that has one end secured to the rotor 52 and an opposite end located inside the housing H, and the output shaft 65 may be formed as a shaft that has one end secured to the rear cover 23 and an opposite end located inside the housing H.

It is desirable for the housing H to be secured to the fixing panel 151 and to be disposed in the space (the external space of the cabinet) isolated from the space in which the drum 2 is located (the internal space in the cabinet). The reason for this is to minimize the transfer of heat in the cabinet (heat radiated from the drum or the drying unit) to the inside of the housing H to thus improve the durability of the power transmission unit 6.

The input shaft 64 may be coupled to the rotor body 521 using the shaft coupling part 54 shown in FIG. 6. The shaft coupling part 54 may include a disc-shaped coupling body 541 and a shaft coupling hole 543, which is formed through the coupling body to allow one end of the input shaft 64 to be coupled thereto.

In order to facilitate assembly of the coupling body 541 and the rotor body 521, the coupling body 541 may be provided with a body protrusion 544, and the rotor body 521 may have a body protrusion through-hole 524 formed therein to allow the body protrusion 544 to be inserted thereinto.

Furthermore, in order to increase the strength of the coupling body 541, the coupling body 541 may be further provided with a coupling body bent portion 542. The coupling body bent portion 542 may be formed such that the surface of the coupling body 541 that faces the housing H is concavely bent toward the rotor body 521. In this case, the rotor body 521 may have a bent portion through-hole 525 formed therein to allow the coupling body bent portion 542 to pass therethrough.

The output shaft 65 may be inserted into the fixing panel through-hole 153 to be connected to the drum 2, and the rear cover 23 may be provided with a shaft bracket 231 (refer to FIG. 4), to which the output shaft 65 is secured. The reason for this is to disperse the stress applied to the center of the rear cover 23 during rotation of the output shaft 65.

In order to prevent sagging of the housing H and to minimize deformation of the driving-unit-mounting recess 152, the housing H may be secured to the fixing panel 151 using a transmission unit bracket 61 and a housing coupling part 612.

As shown in FIG. 4, the transmission unit bracket 61 may have a bracket through-hole 611 to allow the output shaft 65 to pass therethrough, and the housing coupling part 612 may be formed as a bolt that connects the housing H to the transmission unit bracket 61. The transmission unit bracket 61 may be made of the same material as the fixing panel 151, or may be made of a material having strength higher than the strength of the fixing panel 151.

FIG. 4 illustrates the case in which the transmission unit bracket 61 is secured to the surface of the fixing panel 151 that faces the rear cover 23. However, the transmission unit bracket 61 may be secured to the surface facing the cover panel 19 in the space provided by the fixing panel 151.

As shown in FIG. 8, the housing H may include a housing body 62, which is formed in a hollow cylindrical shape and has an opening formed in the surface thereof that faces the fixing panel 151, and a housing cover 63, which is secured to the housing body 62 to close the opening.

The housing body 62 may include an accommodation space 622 in which the gear unit G is mounted. The accommodation space 622 may communicate with the outside through the opening. The accommodation space 622 may be defined by a housing base 621a, to which the input shaft 64 is secured, and a housing circumferential surface 621b, which extends from the edge of the housing base 621a toward the housing cover 63.

As shown in FIG. 9, the housing body 62 may be provided with an input shaft support portion 625, which extends from the housing base 621a toward the rotor 52. The input shaft support portion 625 may be formed as a pipe that surrounds an input shaft through-hole 626 formed through the housing body 62. That is, the input shaft through-hole 626 may be formed through the input shaft support portion 625 so as to communicate with the accommodation space 622.

The input shaft 64 inserted into the input shaft through-hole 626 is rotatably secured to the input shaft support portion 625 using input shaft bearings 628 and 629. The input shaft bearings may include a first input shaft bearing 628 and a second input shaft bearing 629, which is fixed in the input shaft through-hole 626 so as to be located between the first input shaft bearing 628 and the rotor 52.

The free end of the input shaft support portion 625 may be inserted into the coupling body bent portion 542, which is provided at the shaft coupling part 54. The length of the input shaft support portion 625 may need to be increased in order to fix the two input shaft bearings 628 and 629. However, since the free end of the input shaft support portion 625 is inserted into the coupling body bent portion 542, it is possible to minimize the amount of space that is required for installation of the motor 5 and the power transmission unit 6 (thereby minimizing the volume of the laundry treating apparatus).

The housing cover 63 may be formed in any of various shapes, so long as the same is capable of opening or closing the opening formed in the housing body 62. FIG. 8 illustrates the case in which the housing cover 63 is implemented as a disc-shaped cover body 631. The housing cover 63 may be secured to the housing body 62 using a cover-fixing plate 623, which is provided on the housing circumferential surface 621b.

The housing cover 63 may include an output shaft support portion 635, which extends from the cover body 631 toward the fixing panel 151, an output shaft through-hole 632, which is formed through the output shaft support portion 635 to allow the output shaft 65 to be inserted thereinto, and output shaft bearings 638 and 639, which are provided in the output shaft support portion 635 to rotatably secure the output shaft 65 to the output shaft through-hole 632.

The housing cover 63 includes a mounting portion 637, which is provided at the cover body 631 and to which the stator 51 is secured. The mounting portion 637 may be formed in any of various shapes that allow the stator coupling part (the bolt or the like) to be coupled thereto. The drawings illustrate the case in which the mounting portion 637 is formed in a hollow cylindrical shape.

The mounting portion 637 may be provided in a plural number, and the plurality of mounting portions 637 may be disposed on the circumferential surface of the cover body 631. It is desirable for the stator bracket 515 to be provided in the same number as the number of mounting portions 637.

When the mounting portions 637 are formed in the shape of a cylinder that protrudes from the cover body 631 toward the rotor 52, it is desirable for the cover-fixing plate 623 to have fixing plate through-holes 624 formed therein to allow the mounting portions 637 to be inserted thereinto. The reason for this is to minimize the outer diameter of the cover-fixing plate 623 (thereby minimizing the amount of space that is required for installation of the housing).

In order to increase the strength of the housing cover 63, the cover body 631 may be provided with a bent portion 634, which is formed such that a region including the output shaft through-hole 632 protrudes toward the fixing panel 151.

The output shaft bearings may include a first output shaft bearing 638 and a second output shaft bearing 639, which are secured to the output shaft support portion 635 and are located in the output shaft through-hole 631. In addition, in order to prevent external air from being supplied to the output shaft bearings 638 and 639, the housing cover 63 may further include a seal 633, which is secured to the output shaft support portion 635 to close the output shaft through-hole 632.

The housing H is secured to the fixing panel 151 via the housing coupling part 612. The stator 51 is secured to the housing H by securing the stator coupling part, which is inserted into the coupling part through-hole 516, to the mounting portion 637. The rotor 52 is secured to the housing H using the input shaft 64. That is, since the stator 51 and the rotor 52 are secured to the housing H (since the stator and the rotor vibrate together with the housing), it is possible to minimize deterioration in coaxiality between the input shaft 64 and the output shaft 65.

The gear unit G may include a ring gear 66, which is secured to the housing circumferential surface 621*b* and is located in the accommodation space 622, a driving gear 69, which is secured to the input shaft 64 and is located in the accommodation space 622, a cage 67, which is located in the accommodation space 622 and to which the opposite end of the output shaft 65 is secured, and a driven gear 68, which is rotatably secured to the case 67 to connect the driving gear 69 to the ring gear 66.

As shown in FIG. 9, the ring gear 66 may include a gear body 661, which is secured to the housing circumferential surface 621*b*, and gear teeth 662, which are formed on the inner circumferential surface of the gear body.

The cage 67 may include a first base 671, which is located in a gear body through-hole 663 (a through-hole defined by the gear teeth) formed through the gear body and to which one end of the output shaft 65 is secured, a second base 672, which is located in the gear body through-hole 663 and has a base through-hole 673 formed in the center thereof, and a connection shaft 675, which connects the first base to the second base and serves as a rotation shaft of the driven gear 68. Since the output shaft 65 is secured to the first base 671, whether the output shaft 65 rotates is determined depending on whether the cage 67 rotates.

The driven gear 68 may be composed of a plurality of gears. The drawings illustrate the case in which the driven gear is composed of a first driven gear 681, a second driven gear 682, and a third driven gear 683. The input shaft 64 is inserted into the base through-hole 673, and is disposed coaxially with the output shaft 65. The gear teeth of the driving gear 69 are located in the space formed between the driven gears 681, 682, and 683 so as to be engaged with the gear teeth of the driven gears 681, 682, and 683.

As shown in FIG. 10, in order to facilitate coupling or assembly of the ring gear 66 and the housing body 62, the gear body 661 may have a coupling protrusion accommodation recess 664 formed therein, and the housing base 621*a* may be provided with a ring gear coupling protrusion 621*c*, which is inserted into the coupling protrusion accommodation recess 664.

In order to increase the durability of the gear unit G, the housing H may further include a heat insulation part 7. The heat insulation part 7 serves to minimize the transfer of external heat to the accommodation space 622 in the housing, and is preferably made of a material having heat conductivity lower than the heat conductivity of the housing H. That is, when the housing body 62 and the housing cover 63 are made of a metallic material, it is desirable for the heat insulation part 7 to be made of a non-metallic material such as plastic.

When the housing H is secured to the fixing panel 151 and is located in the external space of the cabinet, it is desirable for the heat insulation part 7 to be made of a material having heat conductivity lower than the heat conductivity of the fixing panel 151.

The heat insulation part 7 may be provided so as to surround the entire area of the housing H, or may be provided only in the region of the housing H that faces the fixing panel 151. FIG. 10 illustrates the case in which the heat insulation part 7 is provided only on the housing cover 63 (the region facing the fixing panel).

As shown in FIG. 11, the heat insulation part 7 may be formed integrally with the housing cover 631. In one example, the heat insulation part 7 and the housing cover 63 may be formed through insert injection molding in which a melted material (plastic or the like) is injected into a mold in which the housing cover 63 is accommodated.

The heat insulation part 7 may include a cover insulation body 71, which is secured to the cover body 631, and a support portion insulation body 72, which surrounds the circumferential surface of the output shaft support portion 635. As shown in FIG. 10, the cover insulation body 71 may include at least one of a first insulation body 711, which is formed on the surface of the cover body 631 that faces the fixing panel 151 in the space provided by the cover body 631, or a second insulation body 712, which is formed on the surface of the cover body 631 that faces the housing body 62 in the space provided by the cover body 631.

When the cover insulation body 71 includes both the first insulation body 711 and the second insulation body 712, it is desirable for the cover insulation body 71 to further include a connection body 713, which passes through the cover body 631 to connect the first insulation body 711 to the second insulation body 712. In this case, the cover body 631 needs to have a cover through-hole 636 (refer to FIG. 11) formed therein to allow the connection body 713 to be located therein.

As shown in FIG. 11, the heat insulation part 7 may further include a mounting portion insulation body 73, which surrounds the mounting portion 637. The reason for this is to minimize the transfer of heat from the motor 5 to the cover body 631 through the mounting portion 637. It is desirable for the mounting portion insulation body 73 to surround the entire area of the circumferential surface of the mounting portion 637.

In order to facilitate coupling of the stator 51 and the mounting portion 637, the laundry treating apparatus may further include a stator position setting unit 74. The stator position setting unit 74 may include a bracket protrusion 741 (refer to FIG. 5), which is formed at the stator bracket 515, and a protrusion accommodation recess 742 (refer to FIG. 9), which is formed in the second insulation body 712 to allow the bracket protrusion 741 to be inserted thereinto.

Unlike the above description, the heat insulation part may be secured to the fixing panel 151 so as to be located between the housing cover 63 and the fixing panel 151, or may be secured to the fixing panel 151 so as to be located between the fixing panel 151 and the rear cover 23. In this case, the heat insulation part may surround the fixing panel through-hole 153, and may be formed as a plate having a diameter larger than the diameter of the cover body.

In the power transmission unit 6 having the above-described structure, the gear unit G is located in the accommodation space 622 formed by the housing body 62. That is, the ring gear 66, the driving gear 69, and the driven gear 68 are provided so as to be prevented from escaping the accommodation space 622. The reason why the accommodation space 622 is formed only in the housing body 62 is to install the gear unit G as far as possible from the fixing panel 151 (the heat transmission medium radiating the heat in the cabinet to the outside of the cabinet). Accordingly, the laundry treating apparatus 100 is capable of minimizing deterioration in the durability of the gear unit G.

Meanwhile, in the power transmission unit 6 having the above-described structure, when the driving gear 69 and the driven gear 68 rotate, repulsive force acting between the gears is transmitted to the input shaft 64 and the output shaft 65. That is, when the driving gear and the driven gear rotate, external force acting in a direction away from the housing H or in a direction toward the inside of the housing H is input to the input shaft 64 and the output shaft 65. The above-described operation is more effectively realized when the driving gear, the driven gear, and the ring gear are implemented as helical gears.

As shown in FIG. 12, the laundry treating apparatus 100 may include a damper 9 in order to minimize the risk of separation of the input shaft 64 from the input shaft bearings 628 and 629 or the input shaft support portion 625 due to external force acting on the input shaft 64.

The damper 9 is provided in the input shaft through-hole 626 so as to be located between the first input shaft bearing 628 and the second input shaft bearing 629, and serves to reduce the transmission of vibration of the first input shaft bearing 628 to the second input shaft bearing 629.

The damper 9 may be implemented as an elastic body (rubber or the like) that is secured to the circumferential surface of the input shaft 64 and is located between the first input shaft bearing 628 and the second input shaft bearing 629. As shown in FIG. 8, the damper 9 may include a damping body 91, which has a diameter larger than the diameter of the input shaft 64 and smaller than the diameter of the input shaft through-hole 626 (a damping body, which has a diameter smaller than the outer diameter of the input shaft bearing), and a damping body through-hole 92, which is formed through the damping body 91 and into which the input shaft 64 is inserted.

As shown in FIG. 12, in order to minimize vibration of the housing H, it is desirable that one surface of the damping body 91 be in contact with the first input shaft bearing 628 and that the other surface of the damping body 91 be in contact with the second input shaft bearing 629.

Furthermore, the input shaft support portion 625 may be further provided with a stopper 627 (a first stopper), which protrudes toward the center of the input shaft through-hole 626 and is located between the first input shaft bearing 628 and the second input shaft bearing 629. The first stopper 627 serves to restrict the range within which the first input shaft bearing 628 moves toward the second input shaft bearing 629, or serves to restrict the range within which the second input shaft bearing 629 moves toward the first input shaft bearing 628.

Since the damping body 91 is coupled to the circumferential surface of the input shaft 64 (since the damping body is provided so as to rotate together with the input shaft), it is desirable to set the radius of the damping body 91 (the outer radius of the damper) to be shorter than the distance from the center of the input shaft through-hole 626 to the first stopper 627.

In order to minimize the problem of separation of the output shaft bearings 638 and 639 from the housing H due to external force acting on the output shaft 65, the output shaft support portion 635 may be provided with a stopper 635c (a second stopper), which restricts the movement range of the first output shaft bearing 638 and the movement range of the second output shaft bearing 639. As shown in FIG. 11, the output shaft support portion 635 may include a first mounting portion 635a, in which the first output shaft bearing 638 is located, and a second mounting portion 635b, in which the second output shaft bearing 639 is located. The second stopper 635c may be formed as a protrusion that is located between the first mounting portion 635a and the second mounting portion 635b.

In order to minimize the transfer of heat to the inside of the housing H and to dissipate heat from the housing H to the outside, the laundry treating apparatus may further include a heat dissipation part 8. As shown in FIG. 8, the heat dissipation part 8 may include at least one of a first heat dissipation part 81, which is provided at the coupling body 541 to discharge air present between the housing body 62 and the rotor 52 to the outside of the rotor 52, or a second heat dissipation part 82, which is provided on the circumferential surface 621b of the housing body to dissipate the heat in the accommodation space 622 to the outside of the accommodation space 622.

The first heat dissipation part 81 may be formed as a blade that protrudes from the coupling body 541 toward the housing base 621a. When the rotor 52 rotates, the coupling body 541 and the first heat dissipation part 81 rotate, so air present between the rotor 52 and the housing body 62 is discharged to the outside of the rotor 52 through the rotor through-hole 531, with the result that the temperature of the housing H drops.

FIG. 8 illustrates the case in which the first heat dissipation part 81 is formed as a plurality of blades and the blades are radially disposed about the shaft coupling hole 543. However, only a single blade may be provided at the coupling body 541.

Meanwhile, when the coupling body 541 is provided with the coupling body bent portion 542, it is desirable for the first heat dissipation part 81 to be formed as a blade extending from the coupling body bent portion 542 to the edge of the coupling body 541. This enables the height of the blade (the length of the blade in a direction from the coupling body toward the housing body) to be increased, thereby achieving an effect of increasing the amount of air that is discharged.

The second heat dissipation part 82 may be formed as at least one of a housing protruding portion (a cooling fin or the like) that protrudes from the housing circumferential surface 621b or a housing bent portion (a bent recess or the like) that is bent from the housing circumferential surface 621b toward the accommodation space 622. The second heat dissipation part 82 serves to increase the surface area of the housing circumferential surface 621b, thereby facilitating heat exchange between the housing body 62 and external air.

Hereinafter, the operation process of the above-described power transmission unit 6 will be described with reference to FIG. 13.

FIG. 13 shows the inside of the housing body 62. When the rotor 52 rotates, the input shaft 64 rotates. When the driving gear 69 is rotated by the input shaft 64, the driven gears 681, 682, and 683, which are engaged with the driving gear 69, are also rotated. Since the driven gears 681, 682, and 683 are engaged with the ring gear 66, which is secured to the housing body 62, when the driven gears 68 rotate, the cage 67 and the output shaft 65 rotate, and the drum 2, which is secured to the output shaft 65, also rotates.

A portion of the heat supplied to the drum 2 by the drying unit 3 may be radiated to the outside of the drum 2 (the inside of the cabinet), and the heat in the cabinet may be radiated to the outside of the cabinet. If the heat radiated from the cabinet 1 is transferred to the inside of the housing H of the power transmission unit 6, the durability of the gear unit G may be deteriorated. However, in the laundry treating apparatus 100, the heat insulation part 7 is capable of minimizing the transfer of heat to the inside of the housing H, thus reducing the risk of deterioration in the durability of the gear unit G.

In addition, since the laundry treating apparatus 100 is provided with the first heat dissipation part 81, which is provided at the coupling body 541 connecting the input shaft 64 to the rotor 52, the second heat dissipation part 82, which is provided on the housing circumferential surface 621b, and the motor heat dissipation part 53, which is provided at the rotor, it is possible to minimize the occurrence of the state in which the stator 51 is overheated during rotation of the rotor 52 (during rotation of the drum) and the state in which the accommodation space 622 is overheated.

The above-described laundry treating apparatus may be modified and implemented in various forms, and the scope of the present disclosure is not limited to the embodiments set forth herein.

What is claimed is:

1. A laundry treating apparatus comprising:
  a drum including:
    a drum body defining a space to receive laundry therein,
    a front cover defining a front surface of the drum body,
    a rear cover defining a rear surface of the drum body, and
    a drum introduction opening defined at the front cover and configured to communicate with an inside of the drum body;
  a fixing panel disposed at a position spaced apart from the rear cover;
  a housing including
    a housing body coupled to the fixing panel, the housing body defining an accommodation space and including an opening configured to communicate the accommodation space with an outside of the accommodation space, and
    a housing cover coupled to the housing body and configured to close the opening;
  an input shaft defined at the housing body, one end of the input shaft being disposed at the outside of the accommodation space and an opposite end of the input shaft being disposed in the accommodation space;
  an output shaft defined at the housing cover, one end of the output shaft being coupled to the rear cover and an opposite end of the output shaft being disposed in the accommodation space;
  a gear unit disposed in the accommodation space and configured to transmit a rotational motion of the input shaft to the output shaft;
  a motor including:
    a stator coupled to the fixing panel or the housing and configured to form a rotating magnetic field, and
    a rotor configured to be rotated by the rotating magnetic field;
  a coupling body coupled to the rotor to connect the input shaft to the rotor; and
  a first heat dissipation part disposed at the coupling body and configured to, based on the rotor being rotated, form an airflow between the housing body and the rotor.

2. The laundry treating apparatus of claim 1, wherein the first heat dissipation part comprises a blade protruding from the coupling body toward the housing body.

3. The laundry treating apparatus of claim 1, wherein the first heat dissipation part comprises a plurality of blades protruding from the coupling body toward the housing body, the plurality of blades being disposed at the input shaft in a radial direction.

4. The laundry treating apparatus of claim 2, further comprising:
  a motor heat dissipation part provided at the rotor and configured to dissipate heat in the rotor to an outside of the rotor.

5. The laundry treating apparatus of claim 4, wherein the rotor comprises:
  a rotor body coupled to the coupling body;
  a rotor circumferential surface extending from the rotor body and surrounding a circumferential surface of the stator; and
  a plurality of permanent magnets disposed along the rotor circumferential surface such that N-poles and S-poles are alternately exposed, and
  wherein the motor heat dissipation part includes:
    a rotor through-hole defined at the rotor body and extending in a radial direction of the rotor body; and
    a rotor blade protruding from the rotor body and extending along an edge of the rotor through-hole.

6. The laundry treating apparatus of claim 5, further comprising:
  a coupling body bent portion formed by bending a portion of the coupling body toward the rotor,
  wherein the blade extends from the coupling body bent portion towards an edge of the coupling body.

7. The laundry treating apparatus of claim 1, further comprising:
  a second heat dissipation part provided at the housing body and configured to dissipate heat in the accommodation space to an outside of the accommodation space.

8. The laundry treating apparatus of claim 7, wherein the housing body comprises:

a housing base;

an input shaft through-hole disposed at the housing base and configured to allow the input shaft to be inserted thereinto; and a housing circumferential surface extending from an edge of the housing base toward the fixing panel, and wherein the second heat dissipation part includes a housing protruding portion protruding from the housing circumferential surface.

9. The laundry treating apparatus of claim 7, wherein the housing body comprises:

a housing base;

an input shaft through-hole disposed at the housing base and configured to allow the input shaft to be inserted thereinto; and a housing circumferential surface extending from an edge of the housing base toward the fixing panel, and wherein the second heat dissipation part includes a housing bent portion bent from the housing circumferential surface toward the accommodation space.

10. The laundry treating apparatus of claim 1, further comprising:

an input shaft through-hole disposed at the housing body and configured to allow the input shaft to be inserted thereinto;

an input shaft support portion having a pipe shape and extending from the input shaft through-hole toward the rotor;

a first input shaft bearing disposed at the input shaft support portion and that rotatably couples the input shaft to the input shaft through-hole;

a second input shaft bearing disposed at the input shaft support portion and located between the first input shaft bearing and the coupling body, wherein the second input shaft bearing rotatably couples the input shaft to the input shaft through-hole;

a coupling body bent portion disposed at the coupling body and defining a space in which the input shaft support portion is accommodated; and a bent portion through-hole disposed at the rotor and configured to allow the coupling body bent portion to be inserted thereinto.

11. The laundry treating apparatus of claim 10, further comprising:

a damper disposed between the first input shaft bearing and the second input shaft bearing and configured to reduce transmission of vibration of the first input shaft bearing to the second input shaft bearing.

12. The laundry treating apparatus of claim 10, wherein the gear unit comprises:

a ring gear coupled to the housing body and disposed in the accommodation space;

a driving gear coupled to the input shaft and disposed in the accommodation space;

a cage disposed in the accommodation space and coupled to the opposite end of the output shaft; and a driven gear rotatably coupled to the cage and configured to couple the driving gear to the ring gear.

13. The laundry treating apparatus of claim 12, wherein the ring gear comprises:

a gear body coupled to a housing circumferential surface, and gear teeth disposed at an inner circumferential surface of the gear body.

14. The laundry treating apparatus of claim 13, wherein the cage comprises:

a first base disposed in a gear body through-hole disposed at the gear body, wherein the first base is coupled to one end of the output shaft;

a second base disposed in the gear body through-hole and having a base through-hole disposed at a center of the second base; and a connection shaft coupling the first base to the second base and configured to be a rotation shaft of the driven gear.

15. The laundry treating apparatus of claim 14, wherein the output shaft is coupled to the first base and configured to rotate based on the cage rotating.

* * * * *